US008849541B2

(12) United States Patent
Swann

(10) Patent No.: US 8,849,541 B2
(45) Date of Patent: Sep. 30, 2014

(54) FUEL DELIVERY SYSTEM

(71) Applicant: Rolls-Royce PLC, London (GB)

(72) Inventor: Peter Swann, Nottingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/896,793

(22) Filed: May 17, 2013

(65) Prior Publication Data

US 2013/0340834 A1 Dec. 26, 2013

(30) Foreign Application Priority Data

Jun. 22, 2012 (GB) .................................. 1211061.5

(51) Int. Cl.
*G06F 19/00* (2011.01)
*E03B 1/00* (2006.01)
*G01N 7/00* (2006.01)
*F02C 7/08* (2006.01)
*F02C 9/40* (2006.01)
*F02C 3/30* (2006.01)
*G05D 7/06* (2006.01)

(52) U.S. Cl.
CPC .............. *G05D 7/0617* (2013.01); *F02C 9/40* (2013.01); *Y02T 50/678* (2013.01); *F02C 3/30* (2013.01); *Y02T 50/677* (2013.01); *F05D 2270/08* (2013.01); *Y02T 50/671* (2013.01)
USPC .................... 701/99; 137/2; 73/23.2; 60/39.5

(58) Field of Classification Search
USPC .................... 701/99; 137/2; 73/23.2; 60/39.5
See application file for complete search history.

(56) References Cited

U.S. PATENT DOCUMENTS

| 3,289,409 A | 12/1966 | Schirmer |
| 3,517,505 A | 6/1970 | Anderson et al. |
| 3,517,512 A | 6/1970 | Anderson et al. |
| 4,471,744 A | 9/1984 | Holtz |

(Continued)

FOREIGN PATENT DOCUMENTS

| GB | 2 058 211 A | 4/1981 |
| JP | A-61-149566 | 7/1986 |
| WO | WO 2008/065238 A1 | 6/2008 |

OTHER PUBLICATIONS

Oct. 18, 2012 Search Report issued in British Application No. GB 1211061.5.

(Continued)

*Primary Examiner* — Thomas G Black
*Assistant Examiner* — Tyler Paige
(74) *Attorney, Agent, or Firm* — Oliff PLC

(57) ABSTRACT

A method includes i) identifying a period of operation corresponding to a fuel supply requirement; ii) determining at least one ambient air condition in which the machine will operate during the period; iii) determining a duration of time in which, whilst in the ambient air condition, it is required to achieve a predetermined vapor trail characteristic; iv) determining a resultant fuel composition for use by the machine in the ambient air condition to achieve the characteristic, where the resultant fuel composition includes at least one of the first and second fuel compositions; v) determining the ratio of at least the first and second fuel compositions required for sufficient resultant fuel composition for the duration of time determined in step iii); and vi) producing a first signal indicative of the ratio of at least the first and second fuel compositions required for the duration of time determined in step iii).

20 Claims, 2 Drawing Sheets

(56) References Cited

U.S. PATENT DOCUMENTS

| | | | |
|---|---|---|---|
| 4,766,725 A | 8/1988 | Singh | |
| 5,005,355 A | 4/1991 | Singh | |
| 5,285,256 A | 2/1994 | Nelson et al. | |
| 5,469,830 A | 11/1995 | Gonzalez | |
| 5,546,183 A | 8/1996 | Fegley et al. | |
| 8,166,710 B2* | 5/2012 | Chan et al. | 52/2.13 |
| 8,402,736 B2* | 3/2013 | Noppel et al. | 60/39.5 |
| 2007/0175459 A1 | 8/2007 | Williams et al. | |
| 2008/0072577 A1 | 3/2008 | Taylor et al. | |
| 2009/0013591 A1 | 1/2009 | Bradin et al. | |
| 2010/0043443 A1* | 2/2010 | Noppel et al. | 60/772 |
| 2010/0122519 A1* | 5/2010 | Epstein et al. | 60/39.461 |
| 2010/0132330 A1 | 6/2010 | Noppel et al. | |

OTHER PUBLICATIONS

Sep. 27, 2012 Search Report issued in British Application No. GB1211064.9.

Sep. 18, 2012 Search Report issued in British Application No. GB1211058.1.

U.S. Appl. No. 13/896,690, filed May 17, 2013 in the name of Peter Swann.

U.S. Appl. No. 13/896,766, filed May 17, 2013 in the name of Peter Swann.

* cited by examiner

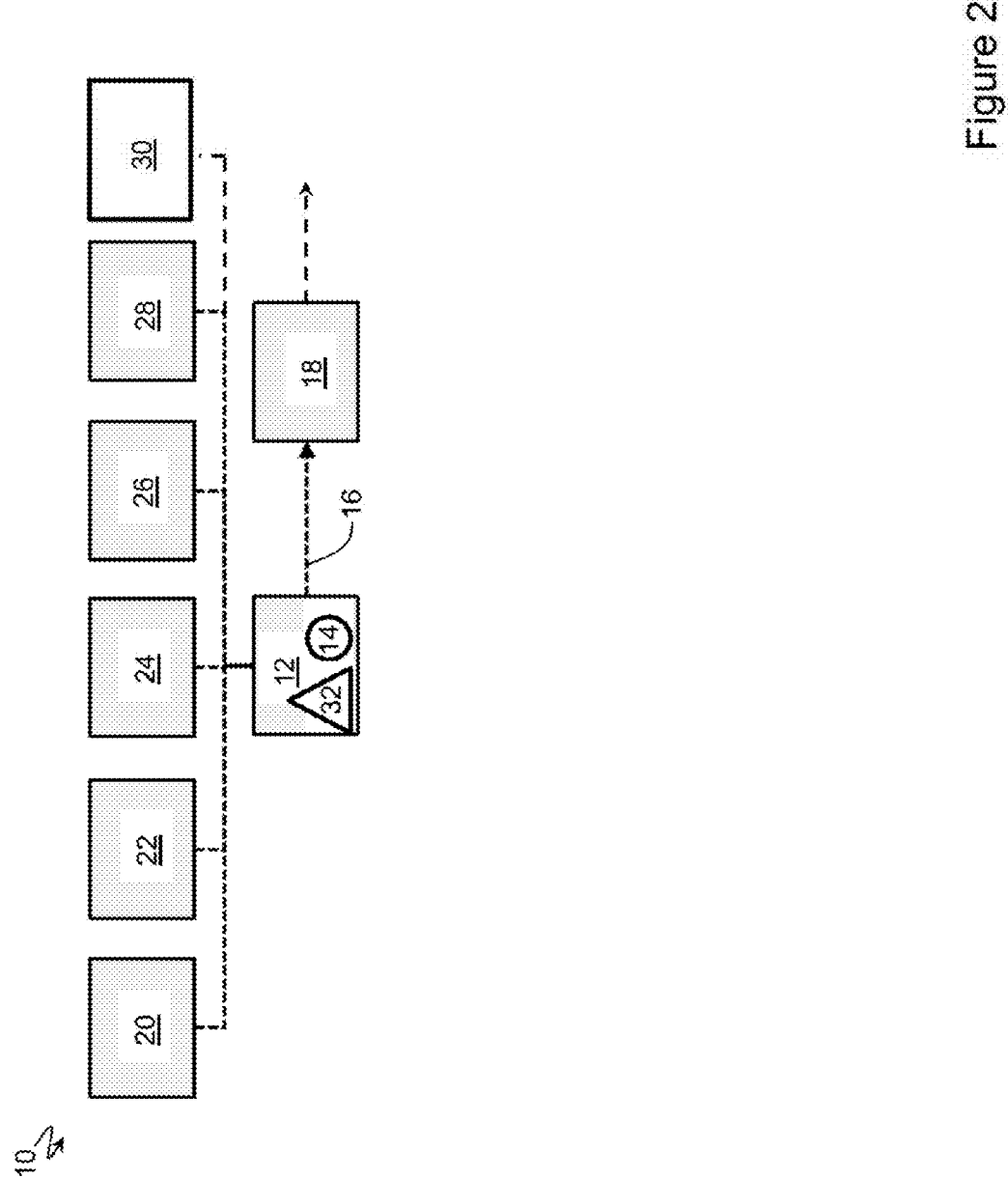

FUEL DELIVERY SYSTEM

The present disclosure relates to a fuel delivery system.

Vapour trails are artificial clouds that are visible trails of condensed water vapour exhausted by vehicles' engines. They may be formed as warm, moist exhaust gas mixes with ambient air, and arise from the precipitation of microscopic water droplets or, if the air is cold enough, tiny ice crystals. The term "vapour trails" is intended to refer both to condensation trails (i.e. contrails) from aircraft and to water and/or ice precipitation in or attributable to the exhaust plumes from engines of other machines and vehicles, such as ships.

The vapour trails of ships are undesirable for some applications. For example, a military ship producing a vapour trail from its exhaust funnels is highly visible from the air and hence much easier to target.

It is known that, depending on the timescale considered, the climate-warming impact of aircraft exhaust vapour trails and resulting vapour trail-cirrus is of a magnitude similar to or perhaps even greater than that of the $CO_2$ emitted by aircraft, and therefore represents a significant element of aviation's total climate impact.

It is also known that the climate warming impact of a vapour trail of a given horizontal extent is determined, at least in part, by its optical depth. Recent scientific work has established that suitable reductions in the number of soot particles emitted per unit mass of fuel burned by an aircraft's engine could reduce the initial optical depth of exhaust vapour trails. Hereafter in this application the number of soot particles emitted per unit mass of fuel burned is termed the "soot emission index".

US2010/0122519 describes the use of ultra-low sulphur aviation fuel as an alternative to conventional fuel to reduce sulphur by-product generation and hence reduce contrail formation. This document emphasises the need to retain the purity of the ultra-low sulphur aviation fuel, and hence the requirement to manage the supply chain which delivers the fuel, and to avoid mixing with other fuels.

An aircraft vapour trail, once formed, will persist in ambient air which is supersaturated with respect to ice. Although aircraft fly on average about 15% of their flight time in regions of ice-supersaturated (ISS) air, this is not necessarily the case on a flight-by-flight basis. For example, and with reference to FIG. 1, which shows a plot of distance travelled by the aircraft (horizontal position) and altitude attained on the flight, in scenario A the aircraft will not encounter ISS air at any point, in scenario B the aircraft encounters ISS air for a large proportion of its route, and in scenario C the aircraft only briefly encounters ISS air.

Hence a system/process/method/device which supports an objective of reducing the optical depth of vapour trails, therefore potentially reducing their climate warming impact, whilst optimising the use of available fuels, is highly desirable.

SUMMARY

Accordingly there is provided a method of determining a ratio for and optionally supplying at least one of a first fuel composition and second fuel composition for use in a machine to achieve a fuel supply requirement, where the first fuel composition is different to the second fuel composition, the method comprising the steps of:
i) identifying a period of operation corresponding to the fuel supply requirement;
ii) determining at least one ambient air condition in which the machine will operate during the period of operation;
iii) determining a duration of time in which, whilst in the ambient air condition, it is required to achieve a predetermined vapour trail characteristic, where the said duration may be equal to or less than the period of operation;
iv) determining a resultant fuel composition for use by the machine in the ambient air condition to achieve the predetermined vapour trail characteristic, where the resultant fuel composition comprises at least one of the first fuel composition and the second fuel composition;
v) determining the ratio of at least the first fuel composition and second fuel composition required to produce sufficient resultant fuel composition for the duration of time determined in step iii); and
vi) producing a first signal indicative of the ratio of at least the first and second fuel compositions required for the duration of time determined in step iii).

The predetermined vapour trail characteristic of step iv) may for example be a particular vapour trail optical depth or minimisation of the vapour trail.

Accordingly there is also provided a fuel delivery system for producing a ratio for and optionally supplying at least one of a first fuel composition and second fuel composition to a machine to achieve a fuel supply requirement, where the first fuel composition is different to the second fuel composition, the fuel delivery system comprising:
a calculator configured to:
a) receive and/or determine data values which are indicative of a period of operation corresponding to the fuel supply requirement;
b) receive and/or determine data values which are indicative of at least one ambient air condition in which the machine will operate during the period of operation; and
c) determine a duration of time in which, whilst in the ambient air condition, it is required to achieve a predetermined vapour trail characteristic, where the said duration may be equal to or less than the period of operation;
d) determine a resultant fuel composition for use by the machine in the ambient air condition to achieve the predetermined vapour trail characteristic, where the resultant fuel composition comprises at least one of the first fuel composition and the second fuel composition;
e) determine the ratio of at least the first fuel composition and second fuel composition required to produce sufficient resultant fuel composition for the duration of time determined in step c); and
f) produce a first signal indicative of the ratio of at least the first and second fuel compositions required for the time period determined in step c).

The system of the present disclosure will enable an accurate calculation and delivery of fuels to vehicles (aircraft, marine etc) required to affect vapour trail characteristics, whilst ensuring the most effective fleet-wide use of fuel, such as biofuels, which may be expensive or in short supply.

In some embodiments the fuel delivery system is configured to extract/receive data values from at least one of an algorithm, lookup-table or database comprising details of vapour trail optical depth and its dependency upon soot emission index at specified ambient conditions including one or more of ambient temperature, ambient pressure and ambient relative humidity with respect to water.

In some embodiments the fuel delivery system comprises a soot requirement generator configured to calculate desired soot emission index and produce a signal indicative of desired soot emission index for use in the calculation of resultant fuel composition.

In some embodiments the soot requirement generator is configured to receive values of one or more of measured, forecast and/or inferred values of the ambient air condition including ambient temperature, ambient pressure and/or ambient humidity which are used in the determination of desired soot emission index.

In some embodiments the calculator is configured to receive values of properties of one or more of first and second fuel composition, combustion characteristics of the engine, and engine operating point at the ambient air condition which are used in the determination of the ratio of at least the first fuel composition and second fuel composition which will achieve the desired soot emission index.

In some embodiments the calculator is configured to determine the total ratio of first fuel composition and second fuel composition required for the period of operation of the machine in dependence upon the ratio of first fuel composition and second fuel composition for each ambient air condition.

In some embodiments the fuel delivery system is configured to produce a second signal indicative of the total ratio of first fuel composition and second fuel composition required.

In some embodiments the fuel delivery system comprises a means to instruct and/or deliver the total ratio of first fuel composition to a first fuel storage tank and a second fuel composition to a second fuel storage tank for the machine respectively in response to the second signal, the first tank and second tank being fluidly isolated from one another.

BRIEF DESCRIPTION OF THE DRAWINGS

Examples of the present disclosure will now be described with reference to the accompanying drawings, in which:

FIG. 2 is a diagrammatic representation of a fuel delivery system according to the present disclosure.

DETAILED DESCRIPTION

Figure 1:
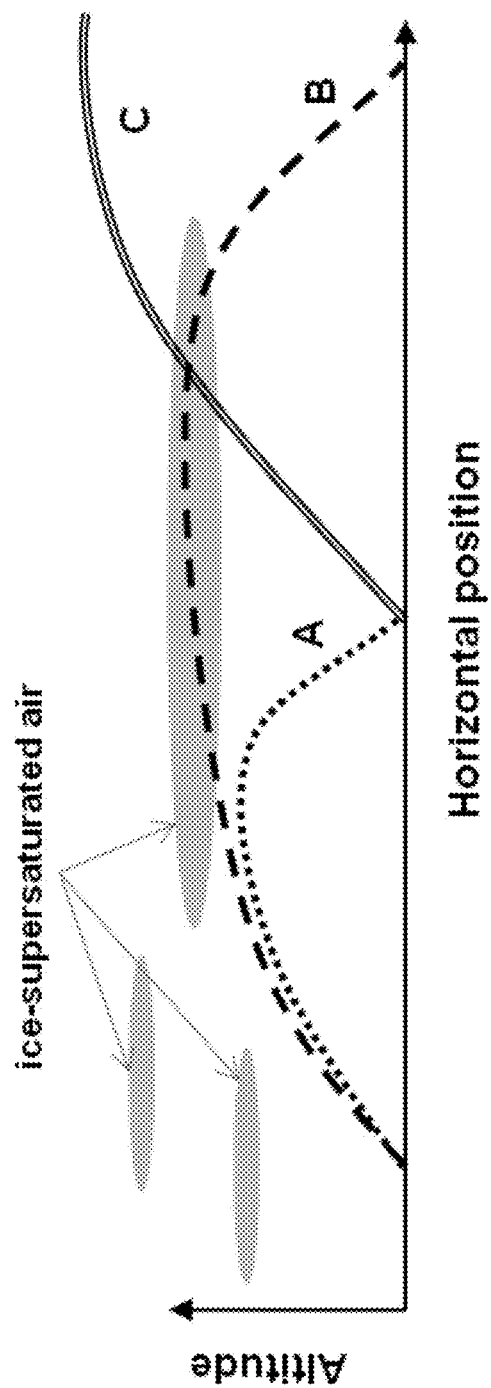
FIG. 1 illustrates several vehicle journey scenarios.

FIG. 2 shows a diagrammatic representation of a fuel delivery system 10 according to the present disclosure. The fuel delivery system 10 is configured to supply at least one of a first fuel composition and second fuel composition to a machine to achieve a fuel supply requirement. The fuel delivery system 10 comprises a calculator 12 which, as described below, is operable to calculate the ratio of at least the first and second fuel compositions required for the operation of the machine. The machine may be a vehicle having an engine, for example an aircraft, marine or land based vehicle. Alternatively the machine may be an engine for a vehicle or a static ground based facility, such as an electricity generation facility or other static engine. The fuel delivery system may be an integral part of the machine, or be essentially separate from it.

Although not the subject of the present disclosure, the machine is configured to selectively blend a first and second fuel composition together during operation for delivery to its combustion system for operation of the machine. The means by which this is achieved is the subject of a co-pending patent application. Suffice it to say that the machine regulates the proportion of first fuel composition and second fuel composition which are blended together at any one time to produce a resultant fuel composition intended to produce a vapour trail optical depth of a predetermined value. As the machine operates at different operating points (for example as engine speeds or throttle settings change over the duration of a journey) and in different ambient conditions (for example, as an aircraft, or a marine vessel moving from location to location, or a static ground based facility past which air of varying properties will pass), the likelihood of vapour trail generation will vary, and extent to which they will persist will also vary. Hence the machine will vary the resultant fuel composition to achieve a desired result (for example a predetermined vapour trail optical depth) subject to the over-arching goal of biasing the fuel composition towards whichever of the first or second fuels is preferred for the majority of use, for example whichever of the first or second fuel compositions is cheapest and/or more readily available.

As will be described below the calculator is configured to produce a first signal 14 indicative of the ratio of at least the first and second fuel compositions required for a portion of the duration of operation of the machine, and also a second signal 16 indicative of the total ratio of first fuel composition and second fuel composition required for the operation of the machine, for example until the next time it is refuelled. The second signal 16 is communicated to a means to instruct and/or deliver (for example a control unit 18) amounts of fuel in the required proportion, that is to say the required proportion of first fuel composition to a first fuel storage tank for the machine in response to the second signal 16, and deliver the required proportion of second fuel composition to a second fuel storage tank for the machine in response to the second signal 16, the first tank and second tank being fluidly isolated from one another. For example the control unit 18 may be configured to produce a visual read out, or configured to send a signal which is read on a receiving visual display unit, or configured to instruct an automated or semi automated refuelling device which then proceeds to supply the machine, or tanks for the machine, with amounts of a first and/or second fuel composition.

The first fuel composition is different to the second fuel composition. The principal difference relates to the level of aromatic or other non-paraffinic content within the respective fuel compositions. In one example the first fuel composition is Kerosene. Additionally or alternatively the second fuel composition is a biofuel. The second fuel composition may be a low-soot-producing (LSP) or alternatively a low-sulphur, low-soot-producing (LSLSP) fuel. Alternatively or additionally the second fuel may be a blend of several such LSP and/or LSLSP fuels whose physical and chemical properties render it suitable for use in an engine in combination with the first fuel composition, for example as an aviation fuel when blended with conventional kerosene. Examples include (but are not limited to) coal-to-liquids (CTL), gas-to-liquids (GTL), biomass-to-liquids (BTL), synthetic paraffinic kerosene (SPK), hydrotreated renewable jet-fuel (HRJ), alcohol-to-jet, and Hydro-processed Esters and Fatty Acids (HEFA).

The calculator 12 is configured to receive and/or determine data values which are used in the determination of the fuel requirement of the machine. The different data, or information required to determine the data values, is represented as a number of boxes in FIG. 2 which feed into the calculator 12.

As represented by box 20, the calculator 12 is configured to receive and/or determine data values which are indicative of a period of operation corresponding to the fuel supply requirement, where the period of operation is a portion of the total duration of operation of the machine 12. That is to say the period of operation may be the expected entire/total duration of the machine, or a part of the expected entire/total duration of the machine. Such data/information may be a proposed route, including altitude profile and time schedule.

As represented by box 22, the calculator 12 is also configured to receive and/or determine data values which are indicative of at least one ambient air condition in which the machine will operate during the period of operation. For example these may include temperature, humidity and pressure. The machine may travel through and/or experience more than one ambient air condition during its entire/total duration of operation, and hence the calculator is configured to consider fuel requirements for each period of operation making up the total duration of operation.

As represented by box 24, the calculator 12 is also configured to receive and/or determine data values which are indicative of a duration of time the machine will operate in the ambient air condition. That is to say, the length of time the machine will operate in the period of operation.

The calculator 12 is further configured to determine a duration of time in which, whilst in the ambient air condition, it is required to achieve a predetermined vapour trail characteristic. This is determined with reference to a policy database, represented by box 26, which identifies the conditions under which modification of vapour trail properties is considered desirable, and the extent to which said properties should be modified.

The calculator 12 is also configured to determine a resultant fuel composition for use by the machine in the ambient air condition to achieve the predetermined vapour trail characteristic, where the resultant fuel composition comprises at least one of the first fuel composition and the second fuel composition. The resultant fuel composition may additionally comprise other fuel compositions, whose relative abundances within the resultant fuel composition are also determined by the calculator.

The calculator 12 is additionally configured to determine the ratio of at least the first fuel composition and second fuel composition required to produce sufficient resultant fuel composition for the duration of time in which, whilst in the ambient air condition, it is required to achieve a predetermined vapour trail characteristic.

The calculator 12 is additionally operable to produce the second signal 16 indicative of the ratio of at least the first and second fuel compositions required for the duration of time in which, whilst in the ambient air condition, it is required to achieve a predetermined vapour trail characteristic.

As represented by box 28 the calculator 12 is configured to extract/receive data values from one or more of an algorithm, look-up table, or database comprising details of vapour trail optical depth and its dependency upon soot emission index at specified ambient conditions including but not necessarily limited to one or more of ambient temperature, ambient pressure and ambient relative humidity with respect to water.

As represented by box 30 the calculator 12 is configured to extract/receive data values from a look up table and/or database comprising detail of properties of one or more of first and second fuel composition, and/or various blends of the first and second fuel compositions and the combustion characteristics of the engine. From these can be calculated or otherwise determined (whether precisely or approximately) the soot emission index likely to be realised at various operating points and ambient conditions, as a function of the relative proportions of the first and second fuel compositions present in the resultant fuel composition when burned by an engine. The first and second fuel compositions may be determined by direct analysis or derived from a database or data record.

The calculator 12 comprises a soot requirement generator 32 configured to calculate desired soot emission index and produce a signal indicative of soot emission index for use in the calculation of resultant fuel composition.

The soot requirement generator 32 is configured to receive values of one or more of measured, forecast and/or inferred values of the ambient air condition including ambient temperature, ambient pressure and/or ambient humidity. It is further configured to calculate the desired soot emission index which, if achieved in that same ambient air condition, would yield the desired vapour trail characteristics.

The soot requirement generator 32 may also be configured to receive values of properties of one or more of first and second fuel composition, combustion characteristics of the engine, at the engine operating point at the ambient air condition which is used in the determination of desired soot emission index. In so doing it may take account of constraints which limit the achievable range of soot emission index at the particular engine operating point and ambient air condition, given the types of fuel available to it. In so doing, the soot requirement generator 32 would be able to avoid specifying a soot emission index which could not be realised in practice.

The calculator 12 is configured to determine the total ratio of first fuel composition and second fuel composition required for the period of operation of the machine in dependence upon the ratio of first fuel composition and second fuel composition for each ambient air condition.

During operation, the above described fuel delivery system performs a number of steps, including
   i) identifying a period of operation corresponding to the fuel supply requirement, which may be received from the data/information source 20.
   ii) determining at least one ambient air condition in which the machine will operate during the period of operation, which may be received from the data/information source 22.
   iii) determining a duration of time in which, whilst in the ambient air condition, it is required to achieve a predetermined vapour trail characteristic, where the said duration may be equal to or less than the period of operation. The duration of time may be received from the data/information source 24. The desired soot emission index, that is to say the soot emission index required to achieve the predetermined vapour trail characteristic, may be calculated using information from the algorithm, look-up-table, database, or any combination thereof 28, comprising details of vapour trail optical depth and its dependency upon soot emission index in the ambient air condition including but not necessarily limited to one or more of ambient temperature, ambient pressure and ambient relative humidity with respect to water.
   iv) determining a resultant fuel composition for use by the machine in the ambient air condition to achieve the desired soot emission index and hence the predetermined vapour trail characteristic, where the resultant fuel composition comprises at least one of the first fuel composition and the second fuel composition;
   v) determining the ratio of at least the first fuel composition and second fuel composition required to produce sufficient resultant fuel composition for the duration of time determined in step iii); and
   vi) producing a first signal 14 indicative of the ratio of at least the first and second fuel compositions required for the duration of time determined in step iii).

Steps iii) to vi) are conducted as many times as required, and the total ratio of first fuel composition and second fuel composition required for the period of operation of the machine is calculated in dependence upon the ratio of first fuel composition and second fuel composition determined for each ambient air condition.

A second signal 16 is produced indicative of the total ratio of first fuel composition and second fuel composition required. In response to the second signal 16, the total ratio of first fuel composition to second fuel composition is delivered to a first fuel storage tank and a second fuel storage tank for the machine respectively, the first tank and second tank being fluidly isolated from one another.

Hence where the machine is a vehicle, the first fuel composition and second fuel composition are delivered prior to the vehicle commencing a journey. In examples where the vehicle is an aircraft, the first fuel composition and second fuel composition are delivered prior to take off of the aircraft, or alternatively during in-flight refuelling.

With reference to step ii), the ambient air condition is identified with reference to the relative positioning of the machine and the ambient air conditions to which the machine is likely to be exposed during the period of operation. Details of the ambient air condition are determined in dependence upon forecast meteorological data 22 including temperature, humidity and/or pressure.

With reference to step iii and step iv, the look up table and/or database 26 represents a policy or policies determining the circumstances under which vapour trail modification should be attempted, and the extent of modification that should be aimed for.

The required resultant fuel composition is determined in dependence upon the ambient air condition and the machine's scheduled operating in the ambient air condition, and the policy embodied in the look-up-table and/or database 26, and constraints limiting the range of permissible resultant fuel compositions.

The determination of required resultant fuel composition also takes into account a desired soot emission index determined by a soot requirement generator 32. The desired soot emission index is determined as a function of one or more measured, forecast and/or inferred values of the ambient air condition including one or more of ambient temperature, ambient pressure and/or ambient humidity. The resultant fuel composition needed to achieve the desired soot emission index may also be determined partly in dependence upon data extracted from a look up table or database 30 detailing properties of at least one of the first and second fuel composition, and the combustion characteristics of the engine at the engine operating point and at the ambient air condition. The first and second fuel compositions may be analysed by the system, or otherwise inferred for instance from specification data, and details of their composition and properties stored for use in determination of the resultant fuel composition throughout the period of operation of the machine.

The soot requirement generator 32 determines a suitable value of soot emission index corresponding to the desired level of vapour trail modification, within the limits imposed by any constraints placed upon the resultant fuel composition. Based on this, the ambient air condition and the expected engine operating point at said ambient air condition, the fuel delivery system 10 further performs the step of determining the likelihood of vapour trail formation and/or vapour trail persistence, and the extent to which the achievable range of soot particle emission index values will allow modification of the vapour trail properties, principally optical depth. This informs its decision making on the relative ratio of first and second fuel composition required. For example, if it is predicted that the range of optimum values for soot emission index will enable material modification of vapour trail optical depth in a location where such is required, then the fuel delivery system will indicate the ratio of the fuel compositions required to achieve such. However, if it is predicted that the range of achievable values for soot emission index is unlikely to result in a material modification of vapour trail optical depth, or alternatively if modification of vapour trail properties is not required due for instance to a predicted absence of vapour trail, then the fuel delivery system may choose to bias the fuel composition for that period of operation towards whichever of the first or second fuels is preferred for general use, for example whichever of the first or second fuel compositions is cheaper and/or more readily available.

The resultant fuel composition may comprise any proportion of first fuel composition and second fuel composition in the range from 0% to 100%. The resultant fuel composition may comprise x % of the first fuel composition and (100−x) % of the second fuel composition, where has a value anywhere in the range of from 0 to 100. For example, the resultant fuel composition may comprise 0% of the first fuel composition and 100% of the second fuel composition. Alternatively the resultant fuel composition may comprise 100% of the first fuel composition and 0% of the second fuel composition. Additionally x may have a value of greater than 0 and less than 100.

In an alternative example the resultant fuel composition may comprise a % of the first fuel composition, b % of the second fuel composition and c % of additional fuel or additive compositions, where a+b c=100%, and a, b or c may be have a value anywhere in the range from 0 to 100.

The system herein described is thus advantageous since it enables a determination of the efficient loading of fuel for a machine, where it is desired that the machine is required to minimise vapour trail generation for at least part of its operation.

In the interests of fuel efficiency (particularly for aircraft) it is important that the vehicles load only the amount of first fuel composition and second fuel composition that is necessary for the proposed journey. The method and device of the present disclosure avoids the need for vehicles to be supplied with environmentally friendly fuels (e.g. biofuel) where it will achieve no substantial or desired environmental benefit related to vapour trail modification. This is of particular benefit as such fuels tend to be more expensive to produce. For vehicles which the system predicts will not operate at conditions or in conditions where vapour trails will occur, or alternatively where it is predicted that the climate change impact of any vapour trails that may be formed is likely to be lower in magnitude than some predetermined threshold value (perhaps due to a predicted non-persistence of those vapour trails), there is no requirement to load any low aromatic and/or non-paraffinic (second) fuel, and hence more of the first fuel (eg kerosene) may be loaded in its place.

In examples where the system of the present disclosure is applied to marine vessels, it may enable the reduction of vapour trails generated from the vessels exhaust, sometimes referred to as "ship tracks".

Although the examples of the system and method herein described relate the blending of a first and second fuel composition, further examples include the blending of additional fuel compositions with the first and second fuel compositions to produce the resultant fuel composition. In such examples further storage tanks may be required for each additional fuel composition, which are fluidly isolated from the first and second tanks described above.

The invention claimed is:

1. A method of supplying at least one of a first fuel composition and second fuel composition for use in a machine to achieve a fuel supply requirement, where the first fuel composition is different to the second fuel composition, the method comprising the steps of:
   i) identifying a period of operation corresponding to the fuel supply requirement;
   ii) determining at least one ambient air condition in which the machine will operate during the period of operation;

iii) determining a duration of time in which, whilst in the ambient air condition, it is required to achieve a predetermined vapour trail characteristic, where the said duration may be equal to or less than the period of operation;
iv) determining a resultant fuel composition for use by the machine in the ambient air condition to achieve the predetermined vapour trail characteristic, where the resultant fuel composition comprises at least one of the first fuel composition and the second fuel composition;
v) determining the ratio of at least the first fuel composition and second fuel composition required for sufficient resultant fuel composition for the duration of time determined in step iii); and
vi) producing a first signal indicative of the ratio of at least the first and second fuel compositions required for the duration of time determined in step iii).

2. A method as claimed in claim 1 wherein the ambient air condition is identified with reference to the relative positioning of the machine and the ambient air conditions to which the machine is likely to be exposed during the period of operation.

3. A method as claimed in claim 1 wherein the ambient air condition is determined in dependence upon forecast meteorological data including temperature, humidity and/or pressure.

4. A method as claimed in claim 1 wherein the predetermined vapour trail characteristic is obtained from an algorithm, look up table and/or database comprising detail of vapour trail persistence and its dependency upon ambient conditions.

5. A method as claimed in claim 1 wherein steps iii) to vi) of claim 1 are repeated for at least one further ambient air condition.

6. A method as claimed in claim 1 wherein the resultant fuel composition is determined in dependence upon the ambient air condition and the machine's scheduled operating point in the ambient air condition.

7. A method as claimed in claim 1 wherein the resultant fuel composition is calculated as a function of desired soot emission index determined by a soot requirement generator, and where optionally
the desired soot emission index is determined as a function of one or more measured, forecast and/or inferred values of the ambient air condition including one or more of ambient temperature, ambient pressure and/or ambient humidity.

8. A method as claimed in claim 1 wherein the ratio of at least the first fuel composition and second fuel composition is derived from a look up table or database in dependence upon at least one of the first and second fuel composition, combustion characteristics of the engine, and engine operating point at the ambient air condition.

9. A method as claimed in claim 1 further comprising the step of determining the likelihood of vapour trail formation and/or vapour trail persistence in dependence upon the ambient air condition and the expected engine operating point at said ambient air condition.

10. A method as claimed in claim 1 wherein the total ratio of first fuel composition and second fuel composition required for the period of operation of the machine is calculated in dependence upon the ratio of first fuel composition and second fuel composition determined for each ambient air condition.

11. A method as claimed in claim 10 wherein a second signal is produced indicative of the total ratio of first fuel composition and second fuel composition required.

12. A method as claimed in claim 11 wherein, in response to the second signal, the total ratio of first fuel composition to second fuel composition is delivered to a first fuel storage tank and a second fuel storage tank for the machine respectively, the first tank and second tank being fluidly isolated from one another.

13. A method as claimed in claim 12 wherein the first fuel composition and second fuel composition are delivered prior to the period of operation.

14. A method as claimed in claim 13 wherein the machine is a vehicle, and the first fuel composition and second fuel composition are delivered prior to the vehicle commencing a journey.

15. A method as claimed in claim 14 wherein the vehicle is an aircraft, and the first fuel composition and second fuel composition are delivered to the aircraft.

16. A fuel delivery system for supplying at least one of a first fuel composition and second fuel composition to a machine to achieve a fuel supply requirement, where the first fuel composition is different to the second fuel composition, the fuel delivery system comprising:
a calculator configured to:
a) receive and/or determine data values which are indicative of a period of operation corresponding to the fuel supply requirement;
b) receive and/or determine data values which are indicative of at least one ambient air condition in which the machine will operate during the period of operation; and
c) determine a duration of time in which, whilst in the ambient air condition, it is required to achieve a predetermined vapour trail characteristic, where the said duration may be equal to or less than the period of operation;
d) determine a resultant fuel composition for use by the machine in the ambient air condition to achieve the predetermined vapour trail characteristic, where the resultant fuel composition comprises at least one of the first fuel composition and the second fuel composition;
e) determine the ratio of at least the first fuel composition and second fuel composition required to produce sufficient resultant fuel composition for the duration of time determined in step c); and
f) produce a first signal indicative of the ratio of at least the first and second fuel compositions required for the time period determined in step c).

17. An engine comprising a fuel delivery system as claimed in claim 16 configured to operate the method of supplying at least one of a first fuel composition and second fuel composition for use in a machine to achieve a fuel supply requirement. where the first fuel composition is different to the second fuel composition, the method comprising the steps of:
i) identifying a period of operation corresponding to the fuel supply Requirement;
ii) determining at least one ambient air condition in which the machine will operate during the period of operation;
iii) determining a duration of time in which, whilst in the ambient air condition, it is required to achieve a predetermined vapour trail characteristic, where the said duration may be equal to or less than the period of operation;
iv) determining a resultant fuel composition for use by the machine in the ambient air condition to achieve the predetermined vapour trail characteristic, where the resultant fuel composition comprises at least one of the first fuel composition and the second fuel composition;
v) determining the ratio of at least the first fuel composition and second fuel composition required for sufficient resultant fuel composition for the duration of time determined in step in); and vi) producing a first signal indicative of the ratio of at least the first and second fuel compositions required for the duration of time determined in step iii).

18. A vehicle comprising a fuel delivery system as claimed in claim 16 configured to operate the method of supplying at least one of a first fuel composition and second fuel composition for use in a machine to achieve a fuel supply requirement, where the first fuel composition is different to the second composition, the method comprising the steps of:
   i) identifying a period of operation corresponding to the fuel supply requirement;
   ii) determining at least one ambient air condition in which he machine will operate during the period of operation;
   iii) determining a duration of time in which, whilst in the ambient air condition, it is required to achieve a predetermined vapour trail characteristic, where the said duration may be equal to or less than the period of operation;
   iv) determining a resultant fuel composition for use by the machine in the ambient air condition to achieve the predetermined vapour characteristic, where the resultant fuel composition comprises at least one of the first fuel composition and the second fuel composition;
   v) determining the ratio of at least the first fuel composition and second fuel composition required for sufficient resultant fuel composition for the duration of time determined in step iii); and
   vi) producing a first signal indicative of the ratio of at least the first and second fuel compositions required for the duration of time determined in step iii).

19. An aircraft comprising a fuel delivery system as claimed in claim 16 configured to operate the method of supplying at least one of a first fuel composition and second fuel composition for use in a machine to achieve a fuel supply requirement, where the first fuel composition is different to the second fuel composition, the method comprising the steps:
   i) identifying a period of operation corresponding to the fuel supply Requirement;
   ii) determining at least one ambient air condition in which the machine will operate during the period of operation;
   iii) determining a duration of time in which, whilst in the ambient air condition, it is required to achieve a predetermined vapour trail characteristic, where the said duration may be equal to or less than the period of operation;
   iv) determining resultant fuel composition for use by the machine in the ambient air condition to achieve the predetermined vapour trail characteristic, where the resultant fuel composition comprises at least one of the first fuel composition and the second fuel composition;
   v) determining the ratio of at least the first fuel composition and second fuel composition required for sufficient resultant fuel composition for the duration of time determined in step iii); and
   vi) producing a first signal indicative of the ratio of at least the first and second fuel compositions required for the duration of time determined in step iii).

20. A static ground based facility comprising a fuel delivery system as claimed in claim 16 configured to operate the method of supplying at least one of a first fuel composition and second fuel composition for use in a machine to achieve a fuel supply requirement, where the first fuel composition is different to the second fuel composition, the method comprising the steps of:
   i) identifying a period of operation corresponding to the fuel supply requirement;
   ii) determining at least one ambient air condition in which the machine will operate during the period of operation;
   iii) determining a duration of time in which, whilst in the ambient air condition, it is required to achieve a predetermined vapour trail characteristic, where said duration ma be equal to or less than the period of operation;
   iv) determining a resultant fuel composition for use by the machine in the ambient air condition to achieve the predetermined vapour trail characteristic, where the resultant fuel composition comprises at least one of the first fuel composition and the second fuel composition;
   v) determining the ratio of at least the first fuel composition and second fuel composition required for sufficient resultant fuel composition for the duration of time determined in step iii); and
   vi) producing a first signal indicative of he ratio of at least the first and second fuel compositions required for the duration of time determined in step iii).

* * * * *